United States Patent
Varekamp et al.

(10) Patent No.: US 11,048,911 B2
(45) Date of Patent: Jun. 29, 2021

(54) APPARATUS FOR DETERMINING CELLULAR COMPOSITION INFORMATION IN ONE OR MORE TISSUE SAMPLES

(71) Applicant: KONINKLIJKE PHILIPS N.V., Eindhoven (NL)

(72) Inventors: Christiaan Varekamp, Veldhoven (NL); Reinhold Wimberger-Friedl, Waalre (NL); David Halter, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/345,393

(22) PCT Filed: Oct. 26, 2017

(86) PCT No.: PCT/EP2017/077487
§ 371 (c)(1),
(2) Date: Apr. 26, 2019

(87) PCT Pub. No.: WO2018/078034
PCT Pub. Date: May 3, 2018

(65) Prior Publication Data
US 2019/0294859 A1    Sep. 26, 2019

(30) Foreign Application Priority Data
Oct. 27, 2016 (EP) ..................................... 16195994
Nov. 4, 2016 (EP) ..................................... 16197370

(51) Int. Cl.
*G06K 9/00* (2006.01)
*G01N 21/00* (2006.01)
(Continued)

(52) U.S. Cl.
CPC ......... *G06K 9/00127* (2013.01); *G01N 21/00* (2013.01); *G02B 21/365* (2013.01);
(Continued)

(58) Field of Classification Search
CPC ......... G06T 2207/30024; G06T 7/0012; G06T 2207/10056; G06T 2207/30096;
(Continued)

(56) References Cited

U.S. PATENT DOCUMENTS 8,873,827 B2   10/2014   McCulloch
9,042,630 B2    5/2015   Binnig
(Continued)

FOREIGN PATENT DOCUMENTS

WO   WO2007136724 A2   11/2007
WO   WO2015052128 A1    4/2015
(Continued)

OTHER PUBLICATIONS

Lipp0lis G. et al., "Automatic Registration of Multi-Modal Microscopy Images for Integrative Analysis of Prostate Tissue Sections", BMC Cancer, Biomed Central, London, GB, vol. 13, No. 1, Sep. 5, 2013 (Sep. 5, 2013), p. 408, XP021159044.
(Continued)

*Primary Examiner* — Li Liu
(74) *Attorney, Agent, or Firm* — Sherry Austin (57) ABSTRACT

The present invention relates to an apparatus (10) for determining cellular composition in one or more tissue sample microscopic images. It is described to provide (210) first image data of at least one tissue sample. The first image data relates to a non-specific staining of a tissue sample of the at least one tissue sample. Second image data of the at least one tissue sample is provided (220). The second image data relates to specific staining of a tissue sample of the at least one tissue sample. Either (i) the tissue sample that has
(Continued)

undergone specific staining is the same as the tissue sample that has undergone non-specific staining, or (ii) the tissue sample that has undergone specific staining is different to the tissue sample that has undergone non-specific staining. A non-specific cellular composition cell density map is determined (230) on the basis of the first image data. A specific cellular composition cell density map is determined (240) on the basis of the second image data. Information regarding cellular composition in the at least one tissue sample is determined (250) on the basis of the non-specific cell density map and the specific cell density map.

15 Claims, 2 Drawing Sheets

(51) Int. Cl.
*G02B 21/36* (2006.01)
*G06T 7/00* (2017.01)

(52) U.S. Cl.
CPC .. *G06T 7/0012* (2013.01); *G06T 2207/10024* (2013.01); *G06T 2207/10056* (2013.01); *G06T 2207/30024* (2013.01)

(58) Field of Classification Search
CPC ........... G06T 2207/30004; G06T 2207/30242; G06K 9/0014; G06K 9/00127; G06K 9/00147
See application file for complete search history.

(56) References Cited

U.S. PATENT DOCUMENTS

| | | |
|---|---|---|
| 9,298,968 B1 | 3/2016 | Peljto |
| 2005/0136509 A1* | 6/2005 | Gholap .............. G01N 33/5091 435/40.5 |
| 2010/0054560 A1* | 3/2010 | Yamashita ............ G06T 7/0012 382/128 |
| 2011/0182490 A1* | 7/2011 | Hoyt ......................... G06T 7/11 382/128 |
| 2013/0230220 A1* | 9/2013 | Yu ......................... G06K 9/0014 382/128 |
| 2013/0338016 A1* | 12/2013 | McDonough ........ G01N 33/582 506/8 |
| 2014/0212889 A1 | 7/2014 | Gouda |
| 2017/0091937 A1* | 3/2017 | Barnes ................. G06K 9/6228 |
| 2017/0103521 A1* | 4/2017 | Chukka ................ G06T 7/0012 |
| 2017/0270666 A1* | 9/2017 | Barnes ...................... G06T 7/12 |
| 2018/0240231 A1 | 8/2018 | Varekamp |

FOREIGN PATENT DOCUMENTS

| | | |
|---|---|---|
| WO | WO2015189264 A1 | 12/2015 |
| WO | WO2016034655 A2 | 3/2016 |
| WO | WO2016107896 A1 | 7/2016 |
| WO | WO2017207373 A1 | 12/2017 |

OTHER PUBLICATIONS

Galon J. et al., ", The Continuum of Cancer Immunosurveillance: Prognostic, Predictive and Mechanistic Signatures", Immunity Review, 39, (2013), pp. 11-26.

Gurcan M.N. et al., "Histopathological Image Analysis: A Review", IEEE Reviews in Biomedical Engineering, vol. 2, pp. 147-171, 2009.

* cited by examiner

APPARATUS FOR DETERMINING CELLULAR COMPOSITION INFORMATION IN ONE OR MORE TISSUE SAMPLES

CROSS-REFERENCE TO RELATED APPLICATIONS

This patent application claims the priority benefit under 35 U.S.C. § 371 of international patent application no. PCT/EP2017/0777487, filed Oct. 26, 2017, which claims the benefit of European Patent Application No. 16195995.5, filed on Oct. 27, 2016, and European Patent Application No. 16197370.6, filed on Nov. 4, 2016, the contents of which are hereby incorporated by reference herein.

FIELD OF THE INVENTION

The present invention relates to an apparatus for determining cellular composition information in one or more tissue samples, to a system for determining cellular composition information in one or more tissue samples, and to a method for determining cellular composition information in one or more tissue samples, as well as to a computer program element and a computer readable medium.

BACKGROUND OF THE INVENTION

Characterization of the tumor micro-environment in particular the immune infiltrate (or cellular composition) is of great importance for precision oncology diagnostics for predicting prognosis and/or response to therapy. Infiltrating lymphocytes can be recognized in H&E stained tissue slides based on their appearance. However, the particular subtype, like cytotoxic T cells, cannot be derived from morphological information only. For subtyping cells immune-histochemical (IHC) staining is performed with specific antibodies that recognize cellular markers (e.g. CD3, CD4, CD8, etc.). If one single IHC marker is not sufficient to characterize the present cellular subtypes then extra markers (and thus further IHC stains) will be required until the pathologist gets a good idea of which cells are present in the region of interest. This is however time and tissue consuming (as multiple sections are required for multiplexed analysis).

U.S. Pat. No. 9,298,968 describes a method using image analysis to identify tissue characteristics for the purpose of compartmentalization of the tissue specimen. Immune cells are identified based on IHC staining and allocated to the identified tissue compartments.

WO2015/189264A1 relates to systems and computer-implemented methods for assessing a risk of cancer recurrence in a patient based on a holistic integration of large amounts of prognostic information for said patient into a single comparative prognostic dataset. A risk classification system may be trained using the large amounts of information from a cohort of training slides from several patients, along with survival data for said patients. For example, a machine-learning-based binary classifier in the risk classification system may be trained using a set of granular image features computed from a plurality of slides corresponding to several cancer patients whose survival information is known and input into the system. The trained classifier may be used to classify image features from one or more test patients into a low-risk or high-risk group. However, there is a need to provide more information on particular subtypes.

SUMMARY OF THE INVENTION

Therefore, it would be advantageous to have an improved technology for detecting cellular composition in tissue samples.

The object of the present invention is solved with the subject matter of the independent claims, wherein further embodiments are incorporated in the dependent claims. It should be noted that the following described aspects of the invention apply also for the apparatus for determining cellular composition information in one or more tissue samples, system for determining cellular composition information in one or more tissue samples and the method for determining cellular composition information in one or more tissue samples, and for the computer program element and the computer readable medium.

According to a first aspect, there is provided an apparatus for determining cellular composition information in one or more tissue sample microscopic images, comprising:

an input unit; and
a processing unit.

The input unit is configured to provide the processing unit with at least one 2D image of at least one tissue sample. First image data of the at least one 2D image relates to a non-specific staining of a tissue sample of the at least one tissue sample. Second image data of the at least one 2D image relates to specific staining of a tissue sample of the at least one tissue sample. Either (a) the tissue sample that has undergone specific staining is the same as the tissue sample that has undergone non-specific staining, or (b) the tissue sample that has undergone specific staining is different to the tissue sample that has undergone non-specific staining. The processing unit is configured to determine a non-specific cellular composition cell density map on the basis of the first image data. The processing unit is also configured to determine a specific cellular composition cell density map on the basis of the second image data. The processing unit is configured to determine information regarding cellular composition in the at least one tissue sample on the basis of the non-specific cell density map and the specific cell density map.

A cellular composition can comprise a cellular distribution. A cellular composition can comprise an immune infiltrate.

A tissue sample can be derived from a biopsy or a resection of tissue material from a patient.

In other words, a non-specific stain can be applied to a tissue sample and an image acquired with first image data from which a non-specific cellular composition cell density map can be determined. Then, a specific stain can be applied to the tissue sample and an image acquired with second image data from which a specific cellular composition cell density map can be determined. Or, a non-specific stain can be applied to a tissue sample and a specific stain can be applied to the tissue sample. Then an image is acquired, which contains both first image data and second image data, with the first image data being used to determine a non-specific cellular composition cell density map and the second image data being used to determine a specific cellular composition cell density map can be determined. Or, a non-specific stain can be applied to a tissue sample and an image acquired with first image data from which a non-specific cellular composition cell density map can be determined. Then, a specific stain can be applied to a different tissue sample and an image acquired with second image data from which a specific cellular composition cell density map can be determined. However, in all cases information regarding cellular composition can be determined from the two cell density maps.

In other words, information obtained from non-specific stained slide(s) can be combined with that obtained from specific stained slide(s) to obtain complementary information. By determining counts for particular areas within images inside and/or outside of for example a tumour in the non-specific stained and specific stained images (e.g., H&E stained and IHC stained images) the relative contribution of a particular subtype of lymphocytes can be derived. The non-specific (e.g. H&E) image can for instance provide the sum of all infiltrating immune cells, while the specific (e.g. IHC) image provides the number of the particular subtype.

The location of specific cell types in the specific image data (e.g. IHC) can be compared with the locations of the infiltrating immune cells in the non-specific image data (e.g. H&E) to confirm the call (avoid false positives) and the distribution of the specific subtype can be compared to the distribution of all complementary lymphocytes (as derived from subtracting the locations of the specific (e.g. IHC) from the locations of the total (e.g. H&E). Instead of H&E images, also information from the H-channel (counterstain) in the IHC image can be used.

To put this another way, a density map of immune cells can be derived based on non-specific (e.g. H&E) staining and this is compared with a density map for a specific immune cell subtype as derived from a specific (e.g., IHC) staining to enable information regarding a complementary fraction of immune cells to be derived. In an example, one density map can be subtracted from the other density map for the purpose of deriving a third density map for the complementary fraction of immune cells.

In an example, the information regarding the cellular composition comprises at least one quantification of a first subtype of cell, wherein the specific staining is configured to target the first subtype of cell.

Thus, the information regarding the cellular composition can be considered to contain at least one quantification of a first subtype of cell. This could be in the form of a "score" or other form of quantification, which relates to a spatial distribution of the cells.

In other words, a non-specific stain is used in order to provide imagery of for example tumour infiltrate, and this provides for enhanced contrast of the tissue sample to enable identification of cellular objects in the sample. Then a specific stain of choice, chosen for a specific immune cell marker, is used to provide imagery of the tumour infiltrate. Information regarding the relative contribution of a particular subtype relating to the specific immune cell marker can then be determined.

In an example, the at least one quantification of the first subtype of cell comprises a density map.

In other words, an image map of the relative contribution of a particular subtype within a tissue sample can be determined. This, along with the absolute cell density map information provided from the non-specific and specific staining provides for valuable diagnostic information.

In an example, the information regarding the cellular composition comprises at least one quantification of a second subtype of cell, wherein the specific staining is configured to target at least one subtype of cell that is different to the second subtype of cell.

In this manner, having a total cell count map density and that provided for a specific subtype, also provides information on other subtypes present—i.e., if the non-specific cell density map values are higher than the specific cell density map values at areas within the imagery, then this is an indicator that there are other subtypes present. The clinician or pathologist can then decide on an additional staining targeted at a different subtype. In other words, in an example a "second" quantification of a second subtype can be provided that is different from a "first" quantification of a first subtype, where the second quantification provides information on one or more subtypes different to the first subtype, thus representing a degree of interest to further analyse the sample, or other sample, with respect to a second subtype.

In an example, the at least one quantification of the second subtype of cell comprises a density map.

In this way, the clinician or pathologist is provided with relative and absolute cell density information across imagery. To put this another way, the quantification can provide local information (e.g., in a tumour area).

In an example, the information regarding the cellular composition comprises at least one quantification, and wherein the processing unit is configured to determine that a population of infiltrate cells relates to a mono-culture on the basis of the at least one quantification.

In other words, absolute and relative cell densities can be used to determine if there is a mono-culture of a particular subtype at particular areas of a tissue sample. For example, a mono-culture exists in an area where both specific and non-specific cell densities are greater than zero, but have similar absolute densities.

In an example, the information regarding the cellular composition comprises at least one quantification. The processing unit is configured to determine that a population of infiltrate cells relates to a population of a subtype of cell that was not targeted by the specific staining on the basis of the at least one quantification.

In this way, absolute and relative cell densities can be used to determine if there is a subtype different to that looked for at particular areas of a tissue sample. For example, this is the case where a non-specific cell density is appreciably greater than a specific cell density in a region. The pathologist can then decide on additional staining directed toward different subtypes.

In an example, the information regarding the cellular composition comprises at least one quantification. The processing unit is configured to exclude regions of the first image and second image from further analysis on the basis of the at least one quantification.

In other words, if the specific staining cell density (e.g. IHC) is greater than the non-specific cell density (e.g. H&E) in a particular part of the tissue sample, then non-specific staining within the specific staining has occurred, for example at a region of necrosis. A clinician or pathologist can then exclude these regions when interpreting the tissue sample, for example calculating an IHC score, or the clinician can decide on using a different stain.

In an example, the information regarding the cellular composition comprises at least one quantification, the at least one quantification comprising the specific cellular composition cell density map being subtracted from the non-specific cellular composition cell density map.

In this manner, a simple measure is provided relating to the relative contribution of a particular subtype, which in combination with absolute cell densities provide valuable diagnostic information. In an example, rather than a subtraction a ratio of the specific cellular composition cell density map to the non-specific cellular composition cell density map can be determined.

In an example, the first image data relates to a first image of the at least one tissue sample and the second image data relates to a second image of the at least one tissue sample. The determination of information regarding cellular composition comprises a registration of the first image to the second image.

In other words a tissue sample is stained with a first non-specific stain, and an image is acquired. Then the same tissue sample, or a different tissue sample, is stained with a second specific stain, and another image is acquired. To account for any misalignment between the images, an image registration process is undertaken.

In this way imaging errors when simultaneously imaging two markers is mitigated, and processing is simplified as de-convolution of image data relating to two markers is not required. Image registration, for example through matching of one or more features in one image with one or more features in another image, then enables the spatial position of cell densities in one image to be compared correctly with the spatial cell densities in another image.

In an example, the first image relates to a first tissue sample and the second image data relates to a second tissue sample.

In other word, a first tissue sample is stained with a non-specific stain and an image acquired. Then, a different tissue sample, for example that for a slice immediately adjacent to the slice of the first tissue sample, is stained with a specific stain and another image is acquired. A registration process is then carried out, in order to match the images as closely as possible. This is possible, because certain features and feature boundaries are present in both images, enabling one image to be registered to the other.

In an example, the non-specific staining comprises Haematoxylin and Eosin (H&E) staining, and the specific staining comprises immune-histochemistry (IHC) staining or immune-fluorescence (IF) staining.

According to a second aspect, there is provided a system for determining cellular composition information in one or more tissue sample microscopic images, comprising:
an image acquisition unit;
an apparatus for determining cellular composition information in one or more tissue samples according to the first aspect; and
an output unit.

The image acquisition unit is configured to acquire the at least one 2D image of the at least one tissue sample. The output unit is configured to output the information regarding the cellular composition.

According to a third aspect, there is provided a method for determining cellular composition information in one or more tissue sample microscopic images, comprising:
a) providing first image data of at least one tissue sample, wherein the first image data relates to a non-specific staining of a tissue sample of the at least one tissue sample;
b) providing second image data of the at least one tissue sample, wherein the second image data relates to specific staining of a tissue sample of the at least one tissue sample;
  wherein (i) the tissue sample that has undergone specific staining is the same as the tissue sample that has undergone non-specific staining, or (ii) the tissue sample that has undergone specific staining is different to the tissue sample that has undergone non-specific staining;
c) determining a non-specific cellular composition cell density map on the basis of the first image data;
d) determining a specific cellular composition cell density map on the basis of the second image data; and
e) determining information regarding cellular composition in the at least one tissue sample on the basis of the non-specific cell density map and the specific cell density map.

In an example, if a difference between the non-specific cell density map and the specific cell density map is near to zero, and the densities are both larger than zero, then a population of infiltrate cells is indicated as a mono-culture.

In an example, if a difference between the non-specific cell density map and the specific cell density map is positive, then an indication is made that there are unaccounted infiltrate cells.

In an example, if a difference between the non-specific cell density map and the specific cell density map is negative, then an indication is made that there are is non-specific staining in the specific stain. In an example, the specific stain is more comprehensive than the non-specific analysis. In that case there can also an unaccounted cell population. This can be utilized for work relating to tumor characterization for molecular analysis.

In an example, the apparatus is used in pathology diagnostics. In an example, the system is used in pathology diagnostics. In an example, the method is used in pathology diagnostics.

According to another aspect, there is provided a computer program element, which when executed by a processing unit, is adapted to perform the method steps as previously described.

According to another aspect, there is provided a computer program element controlling apparatus as previously described which, when the computer program element is executed by a processing unit, is adapted to perform the method steps as previously described.

According to another example, there is provided a computer readable medium having stored a computer element as previously described.

Advantageously, the benefits provided by any of the above aspects and examples equally apply to all of the other aspects and examples and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
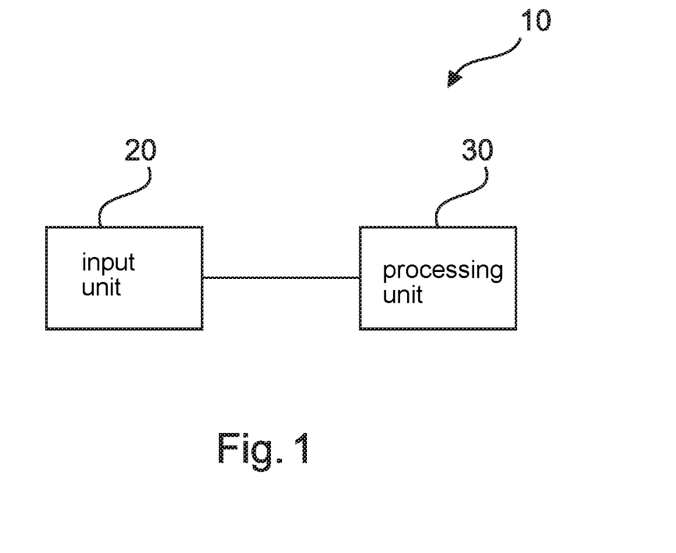
FIG. 1 shows a schematic representation of an example of an apparatus for determining cellular composition information in one or more tissue sample.

FIG. 1 shows an example of an apparatus 10 for determining cellular composition information in one or more tissue sample microscopic images. The apparatus 10 comprises an input unit 20, and a processing unit 30. The input unit 20 is configured to provide the processing unit 30 with at least one 2D image of at least one tissue sample, via wired or wireless communication. First image data of the at least one 2D image relates to a non-specific staining of a tissue sample of the at least one tissue sample. Second image data of the at least one 2D image relates to specific staining of a tissue sample of the at least one tissue sample. Either, (a) the tissue sample that has undergone specific staining is the same as the tissue sample that has undergone non-specific staining, or (b) the tissue sample that has undergone specific staining is different to the tissue sample that has undergone non-specific staining. The processing unit 30 is configured to determine a non-specific cellular composition cell density map on the basis of the first image data. The processing unit 30 is also configured to determine a specific cellular composition cell density map on the basis of the second image data. The processing unit 30 is further configured to determine information regarding cellular composition in the at least one tissue sample on the basis of the non-specific cell density map and the specific cell density map.

In an example, the at least one tissue sample can be at least one biopsy. In an example, a tissue sample can be a tissue section. In an example, the at least one tissue sample comprises coupes cut from a single biopsy. In an example, the at least one tissue sample comprises adjacent coupes cut from a single biopsy.

In an example, the first image data and second image data are comprised within the same image. In an example, the first image data and second image data are comprised within separate images.

In an example, the non-specific staining is H&E staining and the specific staining is the IHC staining.

In an example, the specific staining is H&E staining and the non-specific staining is the IHC staining.

In other words, there can be at least two cases: The first one (H&E=non-specific) is the most likely case. However, a broad IHC marker (IHC=non-specific) can also be used and also a specific type of immune cell can be detected based on morphology from H&E (H&E=specific). Especially this last step seems difficult.

In an example, the information regarding cellular composition is useable for analysis for diagnostic purposes, and/or for patient stratification.

Thus, there are three possible routes to provide the necessary input: (A) apply a non-specific stain to sample 1, image the sample, remove stain 1, apply a specific stain on sample 1 and image; (B) apply specific and non-specific stains at the same time and take one image that is analyzed for specific and non-specific populations; and (C) apply a non-specific stain to sample 1, image, apply a specific stain to sample 2, image, and analyze. (B) is a bit risky and (C) requires consecutive samples to achieve registration of images.

According to an example, the information regarding the cellular composition comprises at least one quantification of a first subtype of cell. The specific staining can then be configured to target the first subtype of cell.

In an example, the information regarding the cellular composition comprises at least one quantification of a first subtype of cell. The specific staining can then be configured to target a cell that belongs to the same type of cell as the first subtype of cell.

To explain further, if for instance in an example the non-specific analysis targets all T cells (round objects) and the specific analysis targets the CD8-positive ones, the second is a subclass of the first, and may not be the same subtype but may belong to the same type.

According to an example, the at least one quantification of the first subtype of cell comprises a density map.

According to an example, the information regarding the cellular composition comprises at least one quantification of a second subtype of cell. The specific staining can then be configured to target at least one subtype of cell that is different to the second subtype of cell.

In an example, an order can be automatically generated for preparing the sample, or another sample, with a second stain for a second subtype. In other words, on the basis of a non-specific stain and a specific stain for a first subtype, it is indicated that there is a discrepancy in indicated cell densities relating to those two stains, it is likely that at least another subtype is present. The apparatus can automatically signify this, enabling the sample or another sample to be prepared for staining with another stain directed towards a different subtype to the first subtype. Thus an algorithm running on the processing unit can, on the basis of a discrepancy in indicated cell densities that could be determined on a threshold ratio between densities, automatically trigger the generation of an order. This order can be presented on a VDU enabling a technician to initiate the preparation of another sample for staining, or a message in the form or an order can be relayed to an appropriate sample preparation suite.

According to an example, the at least one quantification of the second subtype of cell comprises a density map.

According to an example, the information regarding the cellular composition comprises at least one quantification. The processing unit 30 can then be configured to determine that a population of infiltrate cells relates to a mono-culture on the basis of the at least one quantification.

In an example, if a difference between the non-specific cell density map and the specific cell density map is near to zero, and the densities are both larger than zero, then a population of infiltrate cells is indicated as a mono-culture. Thus for example, a "mono-culture" can be indicated or determined that is specifically the type that was measured with IHC/IF. A tolerance/threshold level can be applied to determine when the difference is "near to zero". Such a tolerance/threshold can be set through a specialist/pathologist verifying the accuracy of density estimates for the two populations, enabling a determination to be made regarding how small a difference can be used to assess that a mono-culture is present. There will be an uncertainty in population densities, and this will also depend on the marker being used. The specialist/pathologist however can use their knowledge in determining a tolerance/threshold that can be used based on the density difference to determine is a mono-culture is present or not.

In addition to determining if a mono-culture is present an indication can be required as to how big the differences in population densities are and what the spatial distribution is of that complementary fraction and the detected ones. In order to determine and verify this, a software tool can be used by the specialist/pathologist to manually count, in some selected image regions, the number of cells, compute densities and compare those with the estimated densities. This provides a way to validate the tool while working with it, and enables an understanding to be provided relating to the variability in determined population densities. From this information, for different markers, the specialist/pathologist can determine what tolerance/threshold should be set regarding a difference in population densities when this difference is being used to determine if a mono-culture is present, and/or that unaccounted infiltrate cells are present and/or that non-specific staining in the specific stain has occurred indicating for example that there is necrosis.

In other words, a difference between the two groups can be determined, providing information that can be further utilized. In an example, a non-specific image analysis can be used to predict the specific result. In that case the specific stain can be used as a ground truth for the non-specific algorithm. According to an example, the information regarding the cellular composition comprises at least one quantification. The processing unit 30 can then be configured to determine that a population of infiltrate cells relates to a population of a subtype of cell that was not targeted by the specific staining on the basis of the at least one quantification.

In an example, if a difference between the non-specific cell density map and the specific cell density map is positive, then an indication is made that there are unaccounted infiltrate cells. In this manner, a pathologist may decide on an additional staining or use this fact as diagnostic info. In a similar fashion to that described above regarding determining is a mono-culture is present a tolerance/threshold can be used to determine if there are unaccounted infiltrate cells, with the specialist/pathologist again on the basis of the markers being used and the expected variability in density population being able to provide the required information for such a tolerance/threshold to be set in an appropriate algorithm, and from this the it can be automatically indicated that another stain could be useable to target the unaccounted infiltrate cells.

According to an example, the information regarding the cellular composition comprises at least one quantification. The processing unit 30 can be configured to exclude regions of the first image and second image from further analysis on the basis of the at least one quantification.

In an example, if a difference between the non-specific cell density map and the specific cell density map is negative, then an indication is made that there are is non-specific staining in the specific stain. In an example, the non-specific staining in specific staining (e.g. IHC) can indicate for example that there is necrosis. In this way, the pathologist may use this information to exclude these regions when calculating an IHC score or decide on a different marker. In other words, an efficient means of providing quality control is enabled. Again, this determination can be made on the basis of a tolerance/threshold, with input from the specialist/pathologist as described above.

According to an example, the information regarding the cellular composition comprises at least one quantification, the at least one quantification comprising the specific cellular composition cell density map being subtracted from the non-specific cellular composition cell density map.

In an example, a positive quantification can be used to automatically generate another sample, with a second stain for a second subtype.

In an example, a quantification close to zero can be used to automatically generate an indication that a monoculture exists at one or more areas in the sample.

In an example, a quantification less than zero can be used to automatically exclude areas of the sample from processing.

According to an example, the first image data relates to a first image of the at least one tissue sample and the second image data relates to a second image of the at least one tissue sample. The determination of information regarding cellular composition can then comprise a registration of the first image to the second image.

In an example, registration involves matching of the two images at a cellular level, thus providing for cellular precision registration. In this way, quantifications (cell densities) in each image for different markers can be accurately compared.

According to an example, the first image relates to a first tissue sample and the second image data relates to a second tissue sample.

According to an example, the non-specific staining comprises Haematoxylin and Eosin (H&E) staining, and the specific staining comprises immune-histochemistry (IHC) staining or immune-fluorescence (IF) staining.

Figure 2:
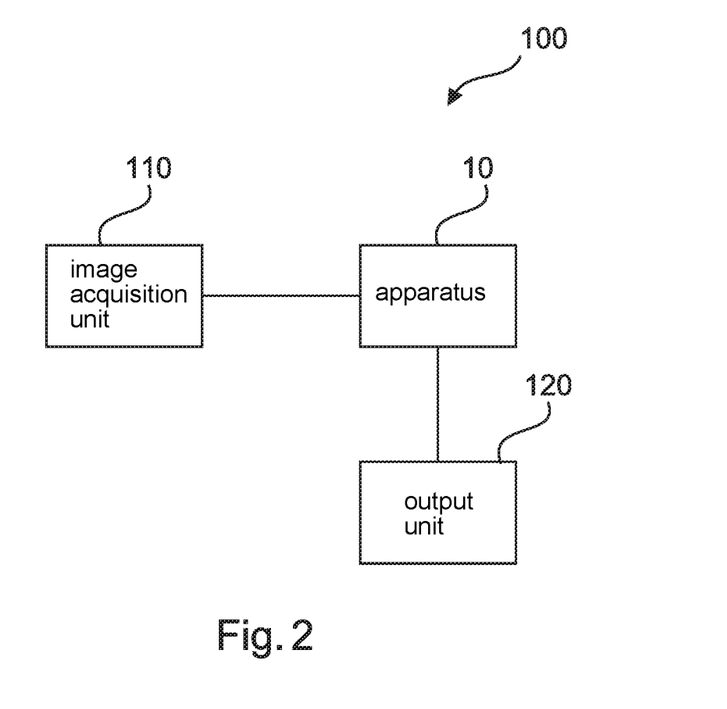
FIG. 2 shows a schematic representation of an example of a system for determining cellular composition information in one or more tissue samples.

In an example, (Messenger RNA-in situ hybridization) mRNA-ISH and PLA technologies can be used FIG. 2 shows an example of a system 100 for determining cellular composition information in one or more tissue sample microscopic images. The system 100 comprises an image acquisition unit 110, and an apparatus 10 for determining cellular composition information in one or more tissue samples as described with respect to any of the examples of FIG. 1. The system 100 also comprises an output unit 120. The image acquisition unit 110 is configured to acquire the at least one 2D image of the at least one tissue sample. The output unit 120 is configured to output the information regarding the cellular composition.

In an example, the image acquisition unit is a Bright Field Microscope. In an example, the image acquisition unit comprises a tomography microscope. In an example, the image acquisition unit comprises a confocal microscope. In an example, the image acquisition unit comprises a transmission microscope. In an example, the image acquisition unit comprises a slide scanner.

Figure 3:
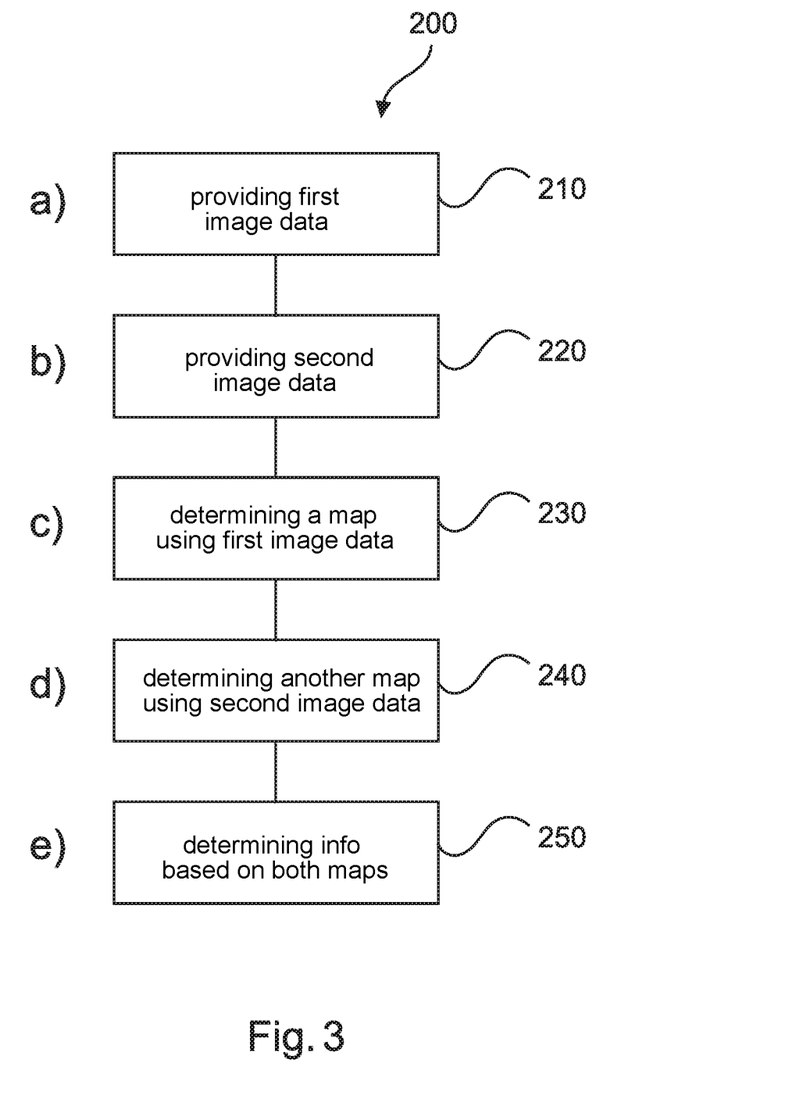
FIG. 3 shows an example of a method for determining cellular composition information in one or more tissue samples.

FIG. 3 shows a method 200 for determining cellular composition information in one or more tissue sample microscopic images in its basic steps. The method 200 comprises:

in a providing step 210, also referred to as step a), providing first image data of at least one tissue sample, wherein the first image data relates to a non-specific staining of a tissue sample of the at least one tissue sample;

in a providing step 220, also referred to as step b), providing second image data of the at least one tissue sample, wherein the second image data relates to specific staining of a tissue sample of the at least one tissue sample;

wherein (i) the tissue sample that has undergone specific staining is the same as the tissue sample that has undergone non-specific staining, or (ii) the tissue sample that has undergone specific staining is different to the tissue sample that has undergone non-specific staining;

in a determining step 230, also referred to as step c), determining a non-specific cellular composition cell density map on the basis of the first image data;

in a determining step 240, also referred to as step d), determining a specific cellular composition cell density map on the basis of the second image data; and in a determining step 250, also referred to as step e), determining information regarding cellular composition in the at least one tissue sample on the basis of the non-specific cell density map and the specific cell density map.

In an example, in step a) an input unit 20 is configured to provide a processing unit 30 with the first image data of the at least one tissue sample.

In an example, the input unit 20 is configured to provide the processing unit 30 with the second image data of the at least one tissue sample.

In an example, in step c) the determining is carried out by the processing unit 30.

In an example, in step d) the determining is carried out by the processing unit 30.

In an example, in step e) the determining is carried out by the processing unit 30.

According to an example, if a difference between the non-specific cell density map and the specific cell density map is near to zero, and the densities are both larger than zero, then a population of infiltrate cells is indicated as a mono-culture. Thus for example, a "mono-culture" can be indicated or determined that is specifically the type that was measured with IHC/IF. The processing unit can be configured to determine this difference and indicate if the population is a monoculture.

According to an example, if a difference between the non-specific cell density map and the specific cell density map is positive, then an indication is made that there are unaccounted infiltrate cells. The processing unit can be configured to determine this difference and indicate if there are unaccounted infiltrate cells. In this manner, a pathologist may decide on an additional staining or use this fact as diagnostic information.

According to an example, if a difference between the non-specific cell density map and the specific cell density map is negative, then an indication is made that there could be non-specific staining in the specific stain. The processing unit can be configured to determine this difference and indicate if there is non-specific staining. In an example, the non-specific staining in specific staining (e.g. IHC) can indicate for example that there is necrosis. In this way, the pathologist may use this information to exclude these regions when calculating an IHC score or decide on a different marker. In other words, an efficient means of providing quality control is enabled. The pathologist can analyze the image to confirm the necrotic appearance.

In an example, step b) comprises staining to target a first subtype of cell, and in step e) the information regarding the cellular composition comprises e1) determining at least one quantification of the first subtype of cell. The determining can be carried out by the processing unit 30.

In an example, in step e1) the at least one quantification of the first subtype of cell comprises a density map.

In an example, step b) comprises staining to target at least one subtype of cell that is different to a second subtype of cell, and in step e) the information regarding the cellular composition comprises e2) determining at least one quantification of the second subtype of cell. The determining can be carried out by the processing unit 30.

In an example, in step e2) the at least one quantification of the second subtype of cell comprises a density map.

In an example, step e) comprises determining at least one quantification, and determining that a population of infiltrate cells relates to a mono-culture on the basis of the at least one quantification. These determinations can be carried out by the processing unit.

In an example, step e) comprises determining at least quantification, and determining that the population of infiltrate cells relates to a population of a subtype of cells that was not targeted by the specific staining on the basis of the at least one quantification. The determining can be carried out by the processing unit.

In an example, step e) comprises determining at least one quantification, and excluding regions of the first image and second image from further analysis on the basis of the at least one quantification. The determining can be carried out by the processing unit.

In an example, step e) comprises determining at least one quantification, comprising the specific cellular composition cell density map being subtracted from the non-specific cellular composition cell density map. The determining can be carried out by the processing unit.

In an example, in step a) the first image data relates to a first image of a first tissue sample, and in step b) the second image data relates to a second image of a second tissue sample, and wherein step e) comprises a registration of the first image to the second image. The registration can be carried out by the processing unit.

The following describes in more detail the need for improvements in oncology diagnostics. Following this, the apparatus, system and method for determining cellular composition information in one or more tissue samples are described in further detail, explaining how specific issues are addressed.

A tissue sample is taken from the body. The sample can be processed with a tissue processor comprising steps of fixation, dehydrogenation and paraffin embedding yielding so-called formalin-fixed paraffin-embedded (FFPE) tissue block. The tissue block is cut to obtain a slice of a desired thickness to be analysed by for example a Bright Field Microscope. The slices can be of the order of 2-10 μm in thickness as would be appreciated by the skilled person as being required in conventional 2D pathological imaging. After staining the tissue slice is immersed in a so-called mounting (fluid) medium in a (potentially partially open) transparent container, and analysed with a Bright Field Microscope to obtain images. Such a microscope, for example, is the Philips Digital Pathology UFS whole slide scanner. The skilled person will however appreciate other ways by which the tissue sample can be imaged. Stains applied to the tissue section (or sample) enable different cells to be detected.

Tumor-associated immune cells, sometimes also denoted as tumor-infiltrating lymphocytes (TIL) play an important role in pathology and oncology diagnostics. The degree of infiltrate and the type of cells have prognostic and predictive value. In addition, for molecular tests on tumor material the dilution of tumor cells with lymphocytes can lead to false negative results and therefore needs to be taken into account. Lymphocytes have a particular appearance as compact, small and rather round cells and can be recognized on Haematoxylin and Eosin (H&E)-stained tissue slides. Within the group of lymphocytes many subtypes are distinguished which have very different functions as part of the immune response of the host to the presence of a tumor which is recognized as foreign or abnormal tissue, with a fuller discussion to be found in the following paper: J. Galon, et al., Immunity, 39, (2015), 11-26, *The Continuum of Cancer Immunosurveillance: Prognostic, Predictive and Mechanistic Signatures*. These subtypes can be determined for instance on the basis of their expression of cell surface markers that have been standardized in the field of immunology and are generally indicated by the prefix CD followed by a number which indicates the antigen for which the immune-staining is done. This immunostaining can involve immune-histochemistry (IHC) which is an established technique in histopathology. Alternatively, also immune-fluorescence can be employed which differs in the kind of label that is used (a fluorophore instead of an enzyme that converts a substrate into an insoluble dye).

Methods for infiltrate detection in images of H&E stained tissue can be based on geometrical features, like shape and area. Many alternative approaches exist for both morphology-based H&E analysis and for analysing specific markers (e.g. IHC), as described for example in the following paper: M. N. Gurcan, et. al. Histopathological Image Analysis: A Review. *IEEE Reviews in Biomedical Engineering*, vol. 2, 2009. These days the machine learning (specifically deep learning) approaches have become successful to solve these kind of problems given that enough training data is present. For the case of H&E based infiltrate detection a neural network can be presented with small example images (e.g. 32×32 pixels) of infiltrate nuclei imaged at a given magnification. This is then the positive training set. As negative training set we may use images of other cell types, stroma or fat. The neural network, once trained, can be used to predict for a given image patch whether that patch contains an infiltrate nucleus or not. Most often, the prediction is applied as a moving window over the image and locations are identified as positives where the spatial detection probability surface has a local maximum and lies above a given threshold. A simpler approach to H&E infiltrate detection is the segmentation/spatial grouping of pixels into small (sub nucleus size) regions based on colour similarity. Combinations of neighbouring regions may then be evaluated in terms of roundness/circularity and stain intensity. When a combination of regions results in a round shape with high stain intensity that is not too large then this may be an infiltrate nucleus. The approach is based on manual parameter tuning.

Immune cell infiltrate detection for a specific IHC marker is often much simpler. If the aim is to calculate a cell nucleus density map, then the specific stain, e.g. DAB, may be detected per pixel using colour deconvolution. If the resulting DAB image for a given pixel is above a given threshold, then this pixel must be part of an infiltrate cell. Since the IHC marker binds specifically to a given set of immune cells, a cell density map may be estimated from pixel-based detection results by assuming a given cell size (in pixel) in the 2D image.

Different image modalities can be geometrically overlaid by aligning them on specific image features on both images. For instance, two adjacent slides from a tissue block can be stained using different markers. In this manner, several different parameters can be determined for the same sample location, e.g. border of tissue, tissue type boundary, or cell.

While the assessment of lymphocyte infiltration in tumours is generally done on H&E-stained slides or their digital images, based on their generic morphological features, it is not possible to distinguish all subtypes of infiltrating cells in this way. However, for predicting prognosis or therapy response of cancer patients the distinction of subtypes is often necessary. Subtyping is based on immunostaining techniques using specific antibodies that bind to certain cell surface proteins which are representative for a particular cell type. Every marker requires a separate staining and image acquisition process, which is laborious but also consumes tissue (new sections need to be cut from the tissue sample which can be very small in case of a needle biopsy). In order to reduce the number of tissue slides and the effort for assessing the Tumour Associated Immune Cell (TAC) subtypes it has been suggested to use multiplexed labelling with fluorophores to stain several CD markers on a single tissue slide. Such an approach is more difficult to introduce in a clinical environment due to the lack of availability of digital pathology scanners with multiplex fluorescence functionality. In addition such an approach does not safeguard the correct assessment due to possible false positive calls due to background fluorescence and staining artefacts.

Therefore, the present apparatus, system and method addresses this through the use of both H&E and IHC/IF image analysis to assess the tumor infiltrate and derive information from the comparison of both image types. IHC/IF-derived infiltrating cells can be considered to be a subset of the H&E-derived infiltrating cells. Knowing the kind of biomarker (CD marker) in the IHC/IF image allows conclusions to be drawn about the type of cells that are derived from the comparison with the H&E-derived infiltrating cells. The following is a detailed workflow of the present method sequence of steps:

1. Derive a cellular composition (e.g. immune infiltrate) density map via a morphological analysis of the H&E image (or the H-channel of a IHC stained) tissue slide.
2. Derive a density map for a specific immune cell marker of choice (like, CD3, CD4, CD8, etc.) from the same or an adjacent slide image (as obtained in an IHC assay or alternatively IF assay) based on the analysis of the stain intensity distribution of the IHC or IF slide.
3. Combine the Haematoxylin-derived cellular composition (e.g. immune infiltrate) density map with the IHC/IF-based density map to interpret whether the stained class of immune cells (as defined by the CD marker) represents locally a small or large subset of all lymphocytes in the tissue, in particular in the tumour area (tumour-infiltrating lymphocytes, TIL). In case a higher density is found in the IHC/IF image locally this can be an indication of a non-specific staining that can be due to for instance necrotic tissue areas. Depending on the choice of the marker (for example the so-called CD markers) and the morphological feature used in the non-specifically stained image one expects the (CD) marker-based density map to be a sub-set of the H&E-derived map, based on the specificity for a particular subtype of immune cells. For instance, by using a lymphocyte detector on the non-specifically stained image that is sensitive for compact intense round objects, this will be primarily detecting T-cells. By comparing this to an analysis of an image that has been stained with CD8 marker, this will obtain the cytotoxic T-cell distribution which can be a significant subset of the total T-cell fraction in which case one can conclude that there is not much infiltration by regulatory T-cells. In another example the subset can be derived from the non-specific staining image. When CD45 is used as the specific staining this will highlight all blood-derived cells that are present in the tumour area, which also comprises for instance macrophages. Macrophages are not compact round objects so they will not be detected by a detector that is trained for such objects. In this case the non-specific cell population can be a subset representing T-cells and as a complement subset all non T-cells. The detectors which are used for the non-specific staining image can be trained for specific unique set of features that can form a subset of the specific stained cell type or a complementary set of cell types or a superset of cell types, depending on the diagnostic application at hand.
4. Calculate a density map for the difference between the Haematoxylin-derived cellular composition (e.g. immune infiltrate) count and the IHC/IF-derived infiltrate count. This represents the spatial distribution of densities of the complementary set of subtypes.
5. Display density maps and optionally descriptors derived from these density maps that characterize the infiltrate in relation to the tumor area. The latter can also be derived from the H&E image by an algorithm or indicated manually by a pathologist.

Further specific details of the apparatus, system and method are now described, providing further details regarding implementation modalities:

Spatial Registration of H&E and IHC Image

This is only necessary in case the Haematoxylin-derived cellular composition (e.g. immune infiltrate) density map is calculated from an adjacent slide, or when the same slide is stained and then imaged and then taken away and re-stained and again imaged. The detector performance may be better than when compared with doing this analysis on the Haematoxylin channel when this is de-convolved from the IHC.

For instance, it is known that colour deconvolution can cause errors for certain IHC stains such as DAB.

H&E-Based Infiltrate Detection

Infiltrate nuclei can often be recognized due to their relatively small size, uniform Haematoxylin stain and round shape. Using example images of infiltrate nuclei (positive set) and example images of other nuclei types (negative set), a machine learning algorithm can be trained to detect infiltrate nuclei.

Calculation of Infiltrate Density Map

The density map calculation step is done by defining a square averaging region of a given size and counting the number of detected infiltrate cells for the square region. The density is then calculated as the number of nuclei per unit area [for example, $\#/mm^2$].

IHC Detection of Cell Type Positive for Selected Marker(s)

This can be done either by counting the number of pixels that are positive for the marker or by counting the number of nuclei that are positive for the marker. In the former case, it is determined how many pixels there typically are per nucleus.

Calculation of IHC Based Cell Type Density Map(s)

Using the output from the previous step the density [$\#/mm^2$] can again be calculated.

Subtract IHC Based Cell Type Density Map from Haematoxylin-Based Infiltrate Density Map The density difference map has both negative and positive values.

If the density difference map is near zero, and the densities are both larger than zero, then the population of infiltrate cells is a 'mono-culture' of specifically the type that was measured with IHC/IF.

If the density difference map is positive, then there are unaccounted infiltrate cells. The pathologist may decide on an additional staining or use this fact as diagnostic info.

If the density difference map is negative then there is non-specific staining in IHC (e.g. necrosis). The pathologist may use this information to exclude these regions when calculating an IHC score or decide on a different marker. The main purpose of this use-case is quality control.

The analysis can be carried out on the whole tissue image or on selected regions of interest. Optionally, the regions of interest can also be selected by a computer program or by the user, or in an interaction of both.

In the above discussion, specific and non-specific stains are described. More information on these is now provided:

Non-specific stain is a method using a dye that binds to the tissue in different degrees depending on the tissue type and certain biological composition of the tissue. Example Hematoxylin binds to the nucleic acids, which are found in the nucleus of a cell and can therefore be used to delineate the nucleus of a cell by the increased stain uptake. The stain intensity is independent of the sequence of the nucleic acids.

A specific stain is a method using a dye that is coupled to a specific recognition molecule that would bind to a target molecule in the sample based on the exact molecular configuration, like the sequence of nucleic acids in the case of a molecular probe (in-situ hybridization) or the sequence and conformation of amino acids of proteins that are recognized by an antibody (immune-histochemistry, or immune-fluorescence).

In specific stain often additional chemistry can be involved to enhance the signal, for instance by an enzyme, like HRP or by branched DNA, or RCA (rolling circle amplification).

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for determining cellular composition information in one or more tissue sample microscopic images, comprising:
   an input unit; and
   a processing unit;
   wherein, the input unit is configured to provide the processing unit with at least one 2D image of at least one tissue sample, wherein first image data of the at least one 2D image relates to a non-specific staining of a tissue sample of the at least one tissue sample, and wherein second image data of the at least one 2D image relates to specific staining of a tissue sample of the at least one tissue sample configured to target a first subtype of cell; wherein (a) the tissue sample that has undergone specific staining is the same as the tissue sample that has undergone non-specific staining, or (b) the tissue sample that has undergone specific staining is different to the tissue sample that has undergone non-specific staining;
   wherein, the processing unit is configured to determine a non-specific cellular composition cell density map on the basis of a morphological feature analysis of the first image data;
   wherein, the processing unit is configured to determine a specific cellular composition cell density map on the basis of a stain intensity distribution analysis of the second image data;
   wherein, the processing unit is configured to determine information regarding cellular composition in the at least one tissue sample on the basis of the non-specific cell density map and the specific cell density map, wherein the information regarding the cellular composition comprises at least one quantification of the first subtype of cell, and comprises at least one quantification of a second subtype of cell, wherein the specific staining is configured to target at least one subtype of cell that is different to the second subtype of cell; and wherein if a difference between the non-specific cell density map and the specific cell density map is positive, then an indication is made that there are unaccounted infiltrate cells.

2. Apparatus according to claim 1, wherein the at least one quantification of the first subtype of cell comprises a density map.

3. Apparatus according to claim 1, wherein the at least one quantification of the second subtype of cell comprises a density map.

4. Apparatus according to claim 1, wherein the information regarding the cellular composition comprises at least one quantification, and wherein the processing unit is configured to determine that a population of infiltrate cells relates to a mono-culture on the basis of the at least one quantification, comprising a determination that the mono-culture exists in an area where both specific and non-specific cell densities are greater than zero, but have similar absolute densities.

5. Apparatus according to claim 1, wherein the information regarding the cellular composition comprises at least one quantification, and wherein the processing unit is configured to determine that a population of infiltrate cells relates to a population of a subtype of cell that was not targeted by the specific staining on the basis of the at least one quantification, comprising a determination that a non-specific cell density is appreciably greater than a specific cell density in a region.

6. Apparatus according to claim 1, wherein the information regarding the cellular composition comprises at least one quantification, and wherein the processing unit is configured to exclude regions of the first image and second image from further analysis on the basis of the at least one quantification.

7. Apparatus according to claim 1, wherein the information regarding the cellular composition comprises at least one quantification, the at least one quantification comprising the specific cellular composition cell density map being subtracted from the non-specific cellular composition cell density map.

8. Apparatus according to claim 1, wherein the first image data relates to a first image of the at least one tissue sample and the second image data relates to a second image of the at least one tissue sample, and wherein the determination of information regarding cellular composition comprises a registration of the first image to the second image.

9. Apparatus according to claim 8, wherein the first image relates to a first tissue sample and the second image data relates to a second tissue sample.

10. Apparatus according to claim 1, wherein the non-specific staining comprises Haematoxylin and Eosin (H&E) staining, and the specific staining comprises immune-histochemistry (IHC) staining or immune-fluorescence (IF) staining.

11. A system for determining cellular composition information in one or more tissue sample microscopic images, comprising:
   an image acquisition unit;
   an apparatus for determining cellular composition information in one or more tissue samples according to claim 1; and
   an output unit;
   wherein, the image acquisition unit is configured to acquire the at least one 2D image of the at least one tissue sample; and
   wherein, the output unit is configured to output the information regarding the cellular composition.

12. A method for determining cellular composition information in one or more tissue sample microscopic images, comprising:
   a) providing first image data of at least one tissue sample, wherein the first image data relates to a non-specific staining of a tissue sample of the at least one tissue sample;
   b) providing second image data of the at least one tissue sample, wherein the second image data relates to specific staining of a tissue sample of the at least one tissue sample to target a first subtype of cell and comprises staining to target at least one subtype of cell that is different to a second subtype of cell; wherein
      (i) the tissue sample that has undergone specific staining is the same as the tissue sample that has undergone non-specific staining, or
      (ii) the tissue sample that has undergone specific staining is different to the tissue sample that has undergone non-specific staining;

c) determining a non-specific cellular composition cell density map on the basis of a morphological feature analysis of the first image data;
d) determining a specific cellular composition cell density map on the basis of a stain intensity distribution analysis of the second image data; and
e) determining information regarding cellular composition in the at least one tissue sample on the basis of the non-specific cell density map and the specific cell density map and e1) determining at least one quantification of the first subtype of cell, and e2) determining at least one quantification of the second subtype of cell; wherein if a difference between the non-specific cell density map and the specific cell density map is positive, then an indication is made that there are unaccounted infiltrate cells.

13. Method according to claim 12, wherein if a difference between the non-specific cell density map and the specific cell density map is near to zero, and the densities are both larger than zero, then a population of infiltrate cells is indicated as a mono-culture.

14. Method according to claim 12, wherein if a difference between the non-specific cell density map and the specific cell density map is negative, then an indication is made that there are is non-specific staining in the specific stain.

15. A non-transitory computer-readable medium having a program stored thereon, which when executed by a processor is configured to carry out the method of claim 12.

* * * * *